(12) United States Patent
Lin et al.

(10) Patent No.: US 8,259,158 B2
(45) Date of Patent: Sep. 4, 2012

(54) METHOD FOR IMPROVING IMAGE QUALITY AND COLOR COMPENSATING DEVICE AND IMAGE PROCESSING DEVICE

(75) Inventors: Yu-Mao Lin, Tainan (TW); Chieh-Cheng Chen, Changhua County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 439 days.

(21) Appl. No.: 12/534,871

(22) Filed: Aug. 4, 2009

(65) Prior Publication Data

US 2010/0271460 A1 Oct. 28, 2010

(30) Foreign Application Priority Data

Apr. 22, 2009 (TW) .................................. 98113315 A

(51) Int. Cl.
*H04N 13/00* (2006.01)
*H04N 7/01* (2006.01)
*H03M 1/12* (2006.01)

(52) U.S. Cl. ........................... 348/43; 348/453; 348/572
(58) Field of Classification Search ...................... 348/60
See application file for complete search history.

(56) References Cited

U.S. PATENT DOCUMENTS

| 6,898,327 | B1 * | 5/2005 | Hrusecky et al. | 382/260 |
| 2006/0188154 | A1 * | 8/2006 | Park et al. | 382/167 |
| 2007/0091205 | A1 * | 4/2007 | MacInnis et al. | 348/448 |
| 2007/0139560 | A1 * | 6/2007 | Zhong | 348/584 |
| 2008/0284914 | A1 * | 11/2008 | Chen et al. | 348/645 |
| 2011/0002392 | A1 * | 1/2011 | Park et al. | 375/240.16 |
| 2011/0164681 | A1 * | 7/2011 | Nakagawa et al. | 375/240.16 |

* cited by examiner

*Primary Examiner* — Joseph Ustaris
*Assistant Examiner* — Kevin McInnish
(74) *Attorney, Agent, or Firm* — Winston Hsu; Scott Margo

(57) ABSTRACT

A method for improving image quality in an image processing device comprises receiving an image signal comprising a plurality of field signals corresponding to a plurality of fields, each field signal comprising a plurality of pixel signals corresponding to a plurality of pixels, and each pixel signal comprising an original chrominance value and a compensating chrominance value; replacing the compensating chrominance value of a pixel signal in every field signal by the original chrominance value of another pixel signal of a same position in another field signal, and generating a primary compensating result corresponding to every pixel signal; calculating a primary weighted sum of a pixel signal corresponding to every pixel and a primary compensating result corresponding to the pixel signal according to a degree of variation corresponding to every pixel of every field; and outputting the primary weighted sum corresponding to every pixel, to output primary compensating field signals.

27 Claims, 17 Drawing Sheets

|  | Field signal Field(k) | A field signal Field(k+1) reciprocal to the field signal Field(k) |
|---|---|---|
| Line(n) | $C_r(n)$ | |
| Line(n+1) | | $C_b(n+1)$ |
| Line(n+2) | $C_b(n+2)$ | |
| Line(n+3) | | $C_r(n+3)$ |
| Line(n+4) | $C_r(n+4)$ | |
| Line(n+5) | | $C_b(n+5)$ |
| Line(n+6) | $C_b(n+6)$ | |
| Line(n+7) | | $C_r(n+7)$ |
| Line(n+8) | $C_r(n+8)$ | |
| Line(n+9) | | $C_b(n+9)$ |
| Line(n+10) | $C_b(n+10)$ | |
| Line(n+11) | | $C_r(n+11)$ |

FIG. 1A PRIOR ART

| | Field(k−1) | Field(k) | Field(k+1) | Field(k+2) |
|---|---|---|---|---|
| Line(n) | $C_r(n)$ | | $C_b(n)$ | |
| Line(n+1) | | $C_b(n+1)$ | | $C_r(n+1)$ |
| Line(n+2) | $C_b(n+2)$ | | $C_r(n+2)$ | |
| Line(n+3) | | $C_r(n+3)$ | | $C_b(n+3)$ |
| Line(n+4) | $C_r(n+4)$ | | $C_b(n+4)$ | |
| Line(n+5) | | $C_b(n+5)$ | | $C_r(n+5)$ |
| Line(n+6) | $C_b(n+6)$ | | $C_r(n+6)$ | |
| Line(n+7) | | $C_r(n+7)$ | | $C_b(n+7)$ |
| Line(n+8) | $C_r(n+8)$ | | $C_b(n+8)$ | |
| Line(n+9) | | $C_b(n+9)$ | | $C_r(n+9)$ |
| Line(n+10) | $C_b(n+10)$ | | $C_r(n+10)$ | |
| Line(n+11) | | $C_r(n+11)$ | | $C_b(n+11)$ |

FIG. 1B PRIOR ART

| | Field(k-1) | Field(k) | Field(k+1) | Field(k+2) |
|---|---|---|---|---|
| Line(n) | | | $C_b^0(n), C_r^p(n)$ | |
| Line(n+1) | $C_b^p(n), C_r^0(n)$ | $C_b^0(n+1), C_r^p(n-1)$ | | $C_b^0(n-1), C_r^p(n+1)$ |
| Line(n+2) | $C_b^0(n+2), C_r^p(n)$ | | $C_b^p(n), C_r^0(n+2)$ | |
| Line(n+3) | | $C_b^p(n+1), C_r^0(n+3)$ | | $C_b^0(n+3), C_r^p(n+1)$ |
| Line(n+4) | $C_b^p(n+2), C_r^0(n+4)$ | | $C_b^0(n+4), C_r^p(n+2)$ | |
| Line(n+5) | | $C_b^0(n+5), C_r^p(n+3)$ | $C_b^p(n+4), C_r^0(n+6)$ | $C_b^p(n+3), C_r^0(n+5)$ |
| Line(n+6) | $C_b^0(n+6), C_r^p(n+4)$ | $C_b^p(n+5), C_r^0(n+7)$ | $C_b^0(n+8), C_r^p(n+6)$ | $C_b^0(n+7), C_r^p(n+5)$ |
| Line(n+7) | $C_b^p(n+6), C_r^0(n+8)$ | $C_b^0(n+9), C_r^p(n+7)$ | $C_b^p(n+8), C_r^0(n+10)$ | $C_b^p(n+7), C_r^0(n+9)$ |
| Line(n+8) | | $C_b^p(n+9), C_r^0(n+11)$ | | |
| Line(n+9) | $C_b^0(n+10), C_r^p(n+8)$ | | | |
| Line(n+10) | | | | $C_b^0(n+11), C_r^p(n+9)$ |

FIG. 3A PRIOR ART

|  | Frame(k-1) | Frame(k) | Frame(k+1) | Frame(k+2) |
|---|---|---|---|---|
| Line(n) | $C_b^p(n), C_r^0(n)$ | $C_b^s(n), C_r^s(n)$ | $C_b^0(n), C_r^p(n)$ | $C_b^s(n), C_r^s(n)$ |
| Line(n+1) | $C_b^s(n+1), C_r^s(n+1)$ | $C_b^0(n+1), C_r^p(n-1)$ | $C_b^s(n+1), C_r^s(n+1)$ | $C_b^0(n-1), C_r^p(n+1)$ |
| Line(n+2) | $C_b^0(n+2), C_r^p(n)$ | $C_b^s(n+2), C_r^s(n+2)$ | $C_b^p(n), C_r^0(n+2)$ | $C_b^s(n+2), C_r^s(n+2)$ |
| Line(n+3) | $C_b^s(n+3), C_r^s(n+3)$ | $C_b^p(n+1), C_r^0(n+3)$ | $C_b^s(n+3), C_r^s(n+3)$ | $C_b^0(n+3), C_r^p(n+1)$ |
| Line(n+4) | $C_b^p(n+2), C_r^0(n+4)$ | $C_b^s(n+4), C_r^s(n+4)$ | $C_b^0(n+4), C_r^p(n+2)$ | $C_b^s(n+4), C_r^s(n+4)$ |
| Line(n+5) | $C_b^s(n+5), C_r^s(n+5)$ | $C_b^0(n+5), C_r^p(n+3)$ | $C_b^s(n+5), C_r^s(n+5)$ | $C_b^p(n+3), C_r^0(n+5)$ |
| Line(n+6) | $C_b^0(n+6), C_r^p(n+4)$ | $C_b^s(n+6), C_r^s(n+6)$ | $C_b^p(n+4), C_r^0(n+6)$ | $C_b^s(n+6), C_r^s(n+6)$ |
| Line(n+7) | $C_b^s(n+7), C_r^s(n+7)$ | $C_b^p(n+5), C_r^0(n+7)$ | $C_b^s(n+7), C_r^s(n+7)$ | $C_b^0(n+7), C_r^p(n+5)$ |
| Line(n+8) | $C_b^p(n+6), C_r^0(n+8)$ | $C_b^s(n+8), C_r^s(n+8)$ | $C_b^0(n+8), C_r^p(n+6)$ | $C_b^s(n+8), C_r^s(n+8)$ |
| Line(n+9) | $C_b^s(n+9), C_r^s(n+9)$ | $C_b^0(n+9), C_r^p(n+7)$ | $C_b^s(n+9), C_r^s(n+9)$ | $C_b^p(n+7), C_r^0(n+9)$ |
| Line(n+10) | $C_b^0(n+10), C_r^p(n+8)$ | $C_b^s(n+10), C_r^s(n+10)$ | $C_b^p(n+8), C_r^0(n+10)$ | $C_b^s(n+10), C_r^s(n+10)$ |
| Line(n+11) | $C_b^s(n+11), C_r^s(n+11)$ | $C_b^p(n+9), C_r^0(n+11)$ | $C_b^s(n+11), C_r^s(n+11)$ | $C_b^0(n+11), C_r^p(n+9)$ |

FIG. 3B PRIOR ART

| | Frame(k−1) | Frame(k) | Frame(k+1) | Frame(k+2) |
|---|---|---|---|---|
| Line(n+2) | $C_b(n+2), C_r(n)$ | $C_b(n+1),$ $[C_r(n-1)+C_r(n+3)]/2$ | $C_b(n), C_r(n+2)$ | $[C_b(n-1)+C_b(n+3)]/2,$ $C_r(n+1)$ |
| Line(n+3) | $C_b(n+2),$ $[C_r(n)+C_r(n+4)]/2$ | $C_b(n+1), C_r(n+3)$ | $[C_b(n)+C_b(n+4)]/2,$ $C_r(n+2)$ | $C_b(n+3), C_r(n+1)$ |
| Line(n+4) | $C_b(n+2), C_r(n+4)$ | $[C_b(n+1)+C_b(n+5)]/2,$ $C_r(n+3)$ | $C_b(n+4), C_r(n+2)$ | $C_b(n+3),$ $[C_r(n+1)+C_r(n+5)]/2$ |
| Line(n+5) | $[C_b(n+2)+C_b(n+6)]/2,$ $C_r(n+4)$ | $C_b(n+5), C_r(n+3)$ | $C_b(n+4),$ $[C_r(n+2)+C_r(n+6)]/2$ | $C_b(n+3), C_r(n+5)$ |
| Line(n+6) | $C_b(n+6), C_r(n+4)$ | $C_b(n+5),$ $[C_r(n+3)+C_r(n+7)]/2$ | $C_b(n+4), C_r(n+6)$ | $[C_b(n+3)+C_b(n+7)]/2,$ $C_r(n+5)$ |
| Line(n+7) | $C_b(n+6),$ $[C_r(n+4)+C_r(n+8)]/2$ | $C_b(n+5), C_r(n+7)$ | $[C_b(n+4)+C_b(n+8)]/2,$ $C_r(n+6)$ | $C_b(n+7), C_r(n+5)$ |

FIG. 3C PRIOR ART

| | Frame(k−1) | Frame(k) | Frame(k+1) | Frame(k+2) |
|---|---|---|---|---|
| Line(n+2) | $C_b(n+2), C_r(n)$ | $[C_b(n)+C_b(n+2)]/2,$ $[C_r(n)+C_r(n+2)]/2$ | $C_b(n), C_r(n+2)$ | $[C_b(n)+C_b(n+2)]/2,$ $[C_r(n)+C_r(n+2)]/2$ |
| Line(n+3) | $[C_b(n+1)+C_b(n+3)]/2,$ $[C_r(n+1)+C_r(n+3)]/2$ | $C_b(n+1), C_r(n+3)$ | $[C_b(n+1)+C_b(n+3)]/2,$ $[C_r(n+1)+C_r(n+3)]/2$ | $C_b(n+3), C_r(n+1)$ |
| Line(n+4) | $C_b(n+2), C_r(n+4)$ | $[C_b(n+2)+C_b(n+4)]/2,$ $[C_r(n+2)+C_r(n+4)]/2$ | $C_b(n+4), C_r(n+2)$ | $[C_b(n+2)+C_b(n+4)]/2,$ $[C_r(n+2)+C_r(n+4)]/2$ |
| Line(n+5) | $[C_b(n+3)+C_b(n+5)]/2,$ $[C_r(n+3)+C_r(n+5)]/2$ | $C_b(n+5), C_r(n+3)$ | $[C_b(n+3)+C_b(n+5)]/2,$ $[C_r(n+3)+C_r(n+5)]/2$ | $C_b(n+3), C_r(n+5)$ |
| Line(n+6) | $C_b(n+6), C_r(n+4)$ | $[C_b(n+4)+C_b(n+6)]/2,$ $[C_r(n+4)+C_r(n+6)]/2$ | $C_b(n+4), C_r(n+6)$ | $[C_b(n+4)+C_b(n+6)]/2,$ $[C_r(n+4)+C_r(n+6)]/2$ |
| Line(n+7) | $[C_b(n+5)+C_b(n+7)]/2,$ $[C_r(n+5)+C_r(n+7)]/2$ | $C_b(n+5), C_r(n+7)$ | $[C_b(n+5)+C_b(n+7)]/2,$ $[C_r(n+5)+C_r(n+7)]/2$ | $C_b(n+7), C_r(n+5)$ |

FIG. 3D PRIOR ART

| | Field(k-1) | Field(k) | Field(k+1) | Field(k+2) |
|---|---|---|---|---|
| Line(n) | Cr1 | | | |
| Line(n+1) | Cb1 | Cb1 | Cb1 | Cr1 |
| Line(n+2) | Cr1 | Cr1 | Cr1 | Cb1 |
| Line(n+3) | Cb1 | Cb1 | Cb1 | Cr1 |
| Line(n+4) | Cr1 | Cr1 | Cr1 | |
| Line(n+5) | Cb2 | Cr2 | Cr2 | Cb2 |
| Line(n+6) | Cr2 | Cb2 | Cb2 | Cr2 |
| Line(n+7) | Cb2 | Cr2 | Cr2 | Cb2 |
| Line(n+8) | Cr2 | | | |
| Line(n+9) | | | | |
| Line(n+10) | | | | |
| Line(n+11) | | | | |

FIG. 4A PRIOR ART

| | Field(k-1) | Field(k) | Field(k+1) | Field(k+2) |
|---|---|---|---|---|
| Line(n) | | | | |
| Line(n+1) | Cr1 | Cb1 | Cb1 | Cr1 |
| Line(n+2) | Cb1 | Cr1 | Cr1 | Cb1 |
| Line(n+3) | | | | |
| Line(n+4) | Cr1 | Cb1 | Cb1 | Cr1 |
| Line(n+5) | | | | |
| Line(n+6) | Cb2, Cr1 | Cb1, Cr2 | Cb1, Cr2 | Cb2, Cr1 |
| Line(n+7) | Cr2 | Cb2 | Cb2 | Cr2 |
| Line(n+8) | | | | |
| Line(n+9) | Cb2 | Cr2 | Cr2 | Cb2 |
| Line(n+10) | | | | |
| Line(n+11) | | | | |

FIG. 4B PRIOR ART

|  | Field(k-1) | Field(k) | Field(k+1) | Field(k+2) |
|---|---|---|---|---|
| Line(n) | $C_b(n), C_r(n)$ |  |  |  |
| Line(n+1) |  | $C_b(n+1), C_r(n+1)$ |  | $C_b(n+1), C_r(n+1)$ |
| Line(n+2) | $C_b(n+2), C_r(n+2)$ |  | $C_b(n+2), C_r(n+2)$ |  |
| Line(n+3) |  | $C_b(n+3), C_r(n+3)$ |  | $C_b(n+3), C_r(n+3)$ |
| Line(n+4) | $C_b(n+4), C_r(n+4)$ |  | $C_b(n+4), C_r(n+4)$ |  |
| Line(n+5) |  | $C_b(n+5), C_r(n+5)$ |  | $C_b(n+5), C_r(n+5)$ |
| Line(n+6) | $C_b(n+6), C_r(n+6)$ |  | $C_b(n+6), C_r(n+6)$ |  |
| Line(n+7) |  | $C_b(n+7), C_r(n+7)$ |  | $C_b(n+7), C_r(n+7)$ |
| Line(n+8) | $C_b(n+8), C_r(n+8)$ |  | $C_b(n+8), C_r(n+8)$ |  |
| Line(n+9) |  | $C_b(n+9), C_r(n+9)$ |  | $C_b(n+9), C_r(n+9)$ |
| Line(n+10) | $C_b(n+10), C_r(n+10)$ |  | $C_b(n+10), C_r(n+10)$ |  |
| Line(n+11) |  | $C_b(n+11), C_r(n+11)$ |  | $C_b(n+11), C_r(n+11)$ |

FIG. 6A

|  | Field(k-1) | Field(k) | Field(k+1) | Field(k+2) |
|---|---|---|---|---|
| Line(n) |  |  |  |  |
| Line(n+1) | Cr1 | Cb1 | Cb1 | Cr1 |
| Line(n+2) | Cb1 | Cr1 | Cr1 | Cb1 |
| Line(n+3) | Cr1 | Cb1 |  |  |
| Line(n+4) |  | Cr1 | Cb1 | Cr1 |
| Line(n+5) |  |  |  |  |
| Line(n+6) | Cb2, Cr2 | Cb2, Cr2 | Cb2, Cr2 | Cb2, Cr2 |
| Line(n+7) |  |  |  |  |
| Line(n+8) | Cr2 | Cb2 | Cb2 | Cr2 |
| Line(n+9) | Cb2 | Cr2 | Cr2 | Cb2 |
| Line(n+10) |  |  |  |  |
| Line(n+11) |  |  |  |  |

FIG. 6B

|  | Frame(k−1) | Frame(k) | Frame(k+1) | Frame(k+2) |
|---|---|---|---|---|
| Line(n+2) | $C_b(n+2), C_r(n)$ | $C_b(n+2), C_r(n+2)$ | $C_b(n), C_r(n+2)$ | $C_b(n+2), C_r(n+2)$ |
| Line(n+3) | $C_b(n+3), C_r(n+3)$ | $C_b(n+1), C_r(n+3)$ | $C_b(n+3), C_r(n+1)$ | $C_b(n+3), C_r(n+1)$ |
| Line(n+4) | $C_b(n+2), C_r(n+4)$ | $C_b(n+4), C_r(n+4)$ | $C_b(n+4), C_r(n+2)$ | $C_b(n+4), C_r(n+4)$ |
| Line(n+5) | $C_b(n+5), C_r(n+5)$ | $C_b(n+5), C_r(n+3)$ | $C_b(n+5), C_r(n+5)$ | $C_b(n+3), C_r(n+5)$ |
| Line(n+6) | $C_b(n+6), C_r(n+4)$ | $C_b(n+6), C_r(n+6)$ | $C_b(n+4), C_r(n+6)$ | $C_b(n+6), C_r(n+6)$ |
| Line(n+7) | $C_b(n+7), C_r(n+7)$ | $C_b(n+5), C_r(n+7)$ | $C_b(n+7), C_r(n+7)$ | $C_b(n+7), C_r(n+5)$ |

FIG. 8

METHOD FOR IMPROVING IMAGE QUALITY AND COLOR COMPENSATING DEVICE AND IMAGE PROCESSING DEVICE

BACKGROUND OF THE INVENTION

1. Field of the Invention

The present invention is related to a method capable of improving image quality and the related color compensating device and image processing device, and more particularly, to a method which can reduce the color flickering phenomena in a television system and the related color compensating device and image processing device.

2. Description of the Prior Art

NTSC, PAL and SECAM are the three most popular analog television systems. Among them, the SECAM system was first developed by some research groups in France and former Soviet Union, and was adopted in numerous countries, like France, countries of former Republics of Soviet Union and some other countries which are former French colonies. The word SECAM is abbreviated from "Séquentiel couleur à mémoire" in French language, and can be translated as "Sequential Color with Memory." While in the development stage of the SECAM system, the researchers noticed that the bit rate of the chrominance components of the image signal is less than the bit rate of the luminance component; therefore, the SECAM system developers assigned a larger bandwidth for the luminance signal Y, and a relatively smaller bandwidth for the chrominance components $C_b$ and $C_r$. Meanwhile, for further squeezing the bandwidth of the chrominance (color) components, the chrominance components $C_b$ and $C_r$ of the SECAM system are being sent to the receiving end by turns, and only one of the chrominance components $C_b$ and $C_r$ is being sent for every pixel. In other words, for every horizontal raster line of the SECAM system, only $C_b$ or $C_r$ is being sent. Therefore, the receiving end of the SECAM signal should first recover the "lost" $C_b$ or $C_r$ which was unsent intentionally by the transmitter, such that a picture can be displayed normally. Please refer to FIG. 1A, which illustrates the distribution of the chrominance components of two reciprocal fields Field(k) and Field(k+1) in a typical SECAM TV picture. Inside FIG. 1A, the symbols Line(n)~Line(n+11) denote raster lines in a frame or in a number of frames, and it can be observed that for every raster line in a frame, only one of the two chrominance components $C_b$ or $C_r$ is being sent, and the chrominance component $C_b$ or $C_r$ is presented in an alternative fashion in a field signal.

Since the SECAM system transfers its TV signals according to an interlaced format, a complete frame should compose of an odd and an even field, and was then transmitted in odd and even fields. Also, in a traditional SECAM TV, the pictures displayed on the screen are also switching between odd fields and even fields for filling the screen. Please refer to FIG. 1B, which illustrates a schematic diagram of the chrominance components $C_b$ and $C_r$ of a column of data of a SECAM TV screen picture displayed as time evolves. The symbol Field(k) denotes the chrominance data of a specific column of the k-th field in temporal domain, and Field(k+1) denotes the chrominance data of the same column of the (k+1)-th field in time, and so forth. Noticeably, any raster line in a field is interlaced with the raster line of its neighboring field(s). Besides, the SECAM TV signal contains 25 frames of picture per second, or 50 fields of picture per second, and hence the time interval between any two neighboring fields is approximately 0.02 seconds.

Briefly speaking, a single field of picture in a SECAM TV signal is insufficient for forming a complete picture, and any field (odd or even) must be combined with its reciprocal field to become a complete picture. In the recent years, a new generation of TV sets using progressive scan has become more popular. The new TV set using the progressive scan displays the picture by frames instead of fields. For a TV set using progressive scan to display a traditional SECAM TV signal using interlaced format, the picture format of the traditional SECAM TV signal must be transformed into frames. In other words, for a progressive scan TV set to display a SECAM signal, the unsent parts of the chrominance signals $C_b$ or $C_r$ must first be "compensated" for a complete field signal, and then the field signal (still the interlaced format) must be compensated to become a frame signals to fit the TV set in progressive format.

Please refer to FIG. 2, which illustrates a schematic diagram of a TV signal decoder 20 of a SECAM TV system of the prior art. The TV signal decoder 20 comprises an analog-to-digital converter 200, an image decoder 204 and a deinterlacer 206. Generally speaking, the analog-to-digital converter 200 converts an analog signal Acol into a digital signal Dcol in 8- to 10-bit format. The image decoder 204 outputs a chrominance component indicator SECAM_cb and an interlaced chrominance signal INTLC0 according to the digital signal Dcol. Please refer to FIG. 3A, which illustrates a schematic diagram of the chrominance components $C_b$ and $C_r$ of the SECAM TV signal in both the temporal and the spatial domain, and is used to represent the output result of the image decoder 204. Inside FIG. 3A, the original chrominance signals are represented by the symbols $C_b^0$ and $C_r^0$, and the parameters inside the parenthesis represent the line number of the raster lines shown. In brief, the image decoder 204 not only needs to decode the original chrominance signals $C_b^0$ and $C_r^0$, but also needs to estimate the primary chrominance components which are not presented in the digital signal Dcol. For example, $C_b^0(n+1)$ represents the original chrominance signal $C_b^0$ in the (n+1)-th raster line, which is decoded directly from the digital signal Dcol, and the primary compensating chrominance signals, which are estimated by the image decoder 204, are denoted as $C_b^P$ and $C_r^P$. Inside FIG. 3A, the primary chrominance signals $C_b^P$ and $C_r^P$ are underlined to differentiate further from the original chrominance signals $C_b^0$ and $C_r^0$. Meanwhile, The arrow signs shown in FIG. 3A demonstrate how the image decoder 204 estimates the primary compensating chrominance signals; that is, the primary compensating chrominance signals $C_b^P$ and $C_r^P$ are simply derived from the original chrominance components $C_b^0$ and $C_r^0$ from the previous raster line in the same field. Besides that, a color component indicator SECAM_cb is utilized for indicating the original chrominance component of the current raster line is a $C_b$ or a $C_r$; when SECAM_cb=1, it represents the current chrominance component $C_b$ is an original chrominance signal $C_b^0$, and the current chrominance signal $C_r$ is a primary compensating chrominance signal $C_r^P$; on the other hand, if SECAM_cb=0, it represents the current chrominance component $C_b$ is a primary compensating chrominance signal $C_b^P$, and the current chrominance signal $C_r$ is an original chrominance signal $C_r^0$. Next, the deinterlacer 206 is used to estimate the chrominance signal INTLC1 which is reciprocal to the chrominance signal INTLC0 in a complete frame picture. Please refer to FIG. 3B, which illustrates the distribution of the chrominance components after the deinterlacer 206 has generated the reciprocal chrominance signal INTLC1. According to FIG. 3B, the chrominance signals INTLC0 and INTLC1 interlace each other to form a complete frame picture. By taking the frame signal Frame(k) as an example, the chrominance signal INTLC0 is equivalent to the field signal Field(k), and the chrominance signal INTLC1 is reciprocal to the chrominance signal INTLC0, which includes the chrominance components in the raster lines Line(n), Line(n+2), Line(n+4) . . . etc. Or, by taking the frame signal Frame(k+1) as an example, the chrominance signal INTLC1 will contain the chrominance components in the raster lines Line(n+1), Line(n+3), Line(n+5) . . . etc. As depicted in FIG. 3B, the secondary compensating chrominance signals $C_b^s$ and $C_r^s$, which are contained in the chrominance signals INTLC1, belong to the same field. Besides, the chrominance signals INTLC0 and INTLC1 of the same field are reciprocal to each other, and the chrominance signal INTLC0 contains the original chrominance signals $C_b^p$ and $C_r^p$, and the primary compensating chrominance signals $C_b^p$ and $C_r^p$.

Noteworthily, the deinterlacer 206 uses a 2D (two-dimensional) deinterlace algorithm or a 3D (three-dimensional) deinterlace algorithm to generate chrominance signal INTLC1. Firstly, please refer to FIG. 3C, which illustrates the distribution of the chrominance components after the deinterlacer 206 has compensated the reciprocal chrominance signal INTLC1 by using the 2D algorithm. The 2D algorithm used by the deinterlacer 206 is to calculate every pixel's secondary compensating chrominance signal $C_b^s$ and $C_r^s$ in the chrominance signal INTLC1 by taking the average of the chrominance components $C_b^0$, $C_r^0$, $C_b^p$ and $C_r^p$ of the neighboring pixels (from above and below) in its reciprocal chrominance signal INTLC0. Next, please refer to FIG. 3D, which illustrates the distribution of the chrominance components after the deinterlacer 206 has compensated the reciprocal chrominance signal INTLC1 by using the 3D algorithm. The 3D algorithm used by the deinterlacer 206 is to calculate every pixel's secondary compensating chrominance signals $C_b^s$ and $C_r^s$ by taking the average of the pixels' chrominance components $C_b^0$, $C_r^0$, $C_b^p$ and $C_r^p$ from the chrominance signals INTLC0 of the previous and the following pictures. Also, please note that the secondary compensating chrominance signals in FIG. 3B are denoted as $C_b^s$ and $C_r^s$, and for better demonstrating the methods used in the 2D and 3D deinterlace process, FIG. 3C and 3D have used the math formula in terms of the chrominance components $C_b^0$, $C_r^0$, $C_b^p$ and $C_r^p$ instead to demonstrate the process of color compensation of the 2D and the 3D deinterlace process.

Simply speaking, after the SECAM TV signals have been processed by the TV signal decoder 20, which includes the analog-to-digital converter 200, the image decoder 204 and the deinterlacer 206, the output becomes a series of frame pictures, and can be directed to the progressive TV for display. However, by investigating the operation of the TV signal decoder 20, a strange phenomena about picture quality can be observed in the chrominance signal INTLC0 output by the image decoder 204. Please refer to FIG. 4A, which illustrates a distribution of the original chrominance signals $C_b^0$, $C_r^0$. There exists two different colors in FIG. 4A, and the chrominance components of the two colors are represented as Cb1, Cr1 and Cb2, Cr2, respectively. Between the raster lines Line(n+5) and Line(n+6), there is an imaginary horizontal boundary between the two colors. Please refer to FIG. 4B, which illustrates a distribution of the original chrominance signals $C_b^0$, $C_r^0$ and the primary compensating chrominance signal $C_b^p$, $C_r^p$. According to the operating principles of the image decoder 204 and as shown in FIGS. 4A and 4B, the primary compensating chrominance signals $C_b^p$, $C_r^p$ of Line (n+6) are directly copied from the original chrominance signals $C_b^0$, $C_r^0$, of Line(n+4), and also, the primary compensating chrominance signals $C_b^p$, $C_r^p$ of Line(n+7) are directly copied from the original chrominance signals $C_b^0$, $C_r^0$ of Line(n+5). Then, when the TV set plays the picture as specified in FIGS. 4A and 4B, it can be observed that the raster line Line(n+6) of the field signals Field(k−1) and Field(k+1) will have its chrominance signals switched from Cb2, Cr1 to Cb1, Cr2, and then back to Cb2, Cr1 in Field(k+3) (not shown in the figure); on the other hand, the raster line Line(n+7) of the field signals Field(k) and Field(k+2) will have its chrominance signals switch from Cb1, Cr2 to Cb2, Cr1, and then back to Cb1, Cr2 in Field(k+4) (not shown in the figure). And, as long as the picture keeps playing at the speed of about 50 fields per second, the color switching (flickering) phenomena will not stop. In other words, the color signals in raster lines Line(n+6) and Line(n+7) will exhibit an unstable phenomena where the color pixels in the color boundary keep flickering. Similarly, when TV displays slow-moving or still color movies, pixels on the color boundary are very likely to display the same unfavorable phenomena of color flickering. Furthermore, since the deinterlacer 206 is to generate the reciprocal color signals INTLC1 according to the input color signal INTLC0, the area of the color flickering in the color signal INTLC0 can be expanded further by the deinterlacer 206 such that an ordinary user can see it easily.

SUMMARY OF THE INVENTION

It is therefore a primary objective of the claimed invention to provide a method and the related color compensating device and image processing device for improving image quality.

The present invention discloses a method for improving the image quality in an image processing device, which comprises receiving an image signal, the image signal comprising a plurality of field signals corresponding to a plurality of fields, each field signal comprising a plurality of pixel signals corresponding to a plurality of pixels, and each pixel signal comprising an original chrominance value and a compensating chrominance value; replacing the compensating chrominance value of a pixel signal in every field signal by the original chrominance value of another pixel signal of a same position in another field signal, and generating a primary compensating result corresponding to every pixel signal; calculating a primary weighted sum of a pixel signal corresponding to every pixel and a primary compensating result corresponding to the pixel signal according to a degree of variation corresponding to every pixel of every field; and outputting in order the primary weighted sum corresponding to every pixel in order to output a plurality of primary compensating field signals.

The present invention further discloses a color compensating device for improving the image quality in an image processing device, which comprises a receiving unit, for receiving an image signal, the image signal comprising a plurality of field signals corresponding to a plurality of fields, each field signal comprising a plurality of pixel signals corresponding to a plurality of pixels, and each pixel signal comprising an original chrominance value and a compensating chrominance value; a primary chrominance compensating unit, for replacing the compensating chrominance value of a pixel signal in every field signal by the original chrominance value of another pixel signal of a same position in another field signal, and generating a primary compensating result corresponding to every pixel signal; a primary chrominance weighting unit, for calculating a primary weighted sum of a pixel signal corresponding to every pixel and a primary compensating result corresponding to the pixel signal according to a degree of variation corresponding to every pixel of every field; and a primary field output unit, for outputting in order the primary weighted sum corresponding to every pixel in order to output a plurality of primary compensating field signals.

The present invention further discloses an image processing device capable of improving the image quality, which comprises a receiving unit, for receiving an analog image signal; an analog-to-digital converter, for converting the analog image signal into a digital image signal; a decoding unit, for decoding the digital image signal and generating a plurality of field signals corresponding to a plurality of fields, each field signal comprising a plurality of pixel signals corresponding to a plurality of pixels of a field, and each pixel signal comprising an original chrominance value and a compensating chrominance value; and a color compensating device. The color compensating device comprises a receiving unit, for receiving an image signal, the image signal comprising a plurality of field signals corresponding to a plurality of fields, each field signal comprising a plurality of pixel signals corresponding to a plurality of pixels, and each pixel signal comprising an original chrominance value and a compensating chrominance value; a primary chrominance compensating unit, for replacing the compensating chrominance value of a pixel signal in every field signal by the original chrominance value of another pixel signal of a same position in another field signal, and generating a primary compensating result corresponding to every pixel signal; a primary chrominance weighting unit, for calculating a primary weighted sum of a pixel signal corresponding to every pixel and a primary compensating result corresponding to the pixel signal according to a degree of variation corresponding to every pixel of every field; and a primary field output unit, for outputting in order the primary weighted sum corresponding to every pixel in order to output a plurality of primary compensating field signals.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1A illustrates a schematic diagram of the distribution of chrominance components of two reciprocal fields in a typical SECAM TV picture.

FIG. 1B illustrates a schematic diagram of chrominance components $C_b$ and $C_r$ of a column of data of a typical SECAM TV screen picture displayed as time evolves.

FIG. 3A illustrates a schematic diagram of chrominance components $C_b$ and $C_r$ of a typical SECAM TV signal in temporal and spatial domains.

FIG. 3B illustrates a schematic diagram of the distribution of the chrominance components of a typical SECAM TV after operations of a deinterlacer.

FIG. 3C illustrates a schematic diagram of the distribution of the chrominance components of a typical SECAM TV after operations of a deinterlacer by using a 2D algorithm.

FIG. 3D illustrates a schematic diagram of the distribution of the chrominance components of a typical SECAM TV after operations of a deinterlacer by using a 3D algorithm.

FIG. 4A illustrates a schematic diagram of the distribution of original chrominance signals in the prior art.

FIG. 4B illustrates a schematic diagram of the distribution of original chrominance signals and primary compensating chrominance signal after operations of a decoder in the prior art.

FIG. 6A illustrates a schematic diagram of the distribution of chrominance components after a decoding unit has completed filling up the chrominance signals.

FIG. 6B illustrates a schematic diagram of the distribution of original chrominance signals and primary compensating chrominance signal according to an embodiment of the present invention.

FIG. 8 illustrates a schematic diagram of the distribution of chrominance components after a 3D chrominance compensating unit has completed filling up a chrominance signal.

DETAILED DESCRIPTION

The major purpose of the present invention is to transform the interlaced field signal format of the SECAM TV signal to the progressive frame signal format, and eliminate the color flickering phenomena displayed in the prior art. For properly explaining the functions and working principles of the present invention, the symbols used for representing the original chrominance signals $C_b^0$, $C_r^0$, the primary compensating chrominance signals $C_b^p$, $C_r^p$, and the secondary compensating chrominance signals $C_b^s$, $C_r^s$ are adopted in the following explanation.

Figure 2:
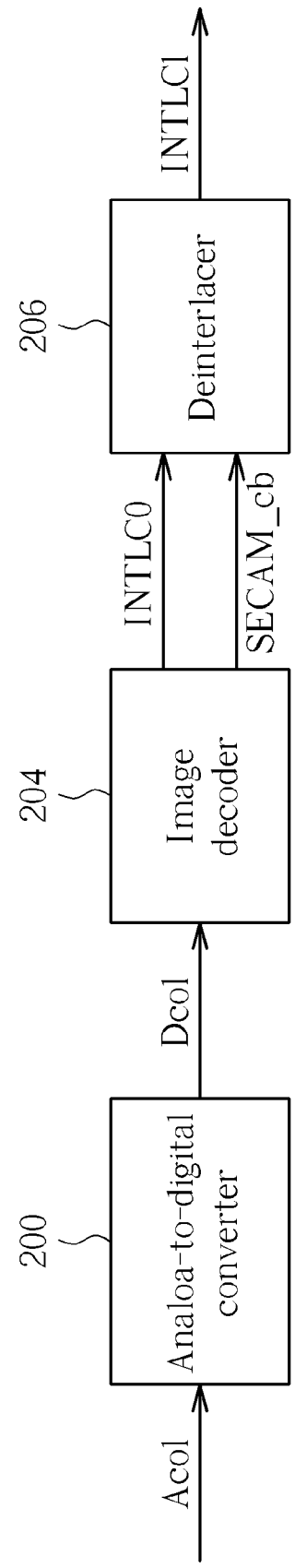
FIG. 2 illustrates a schematic diagram of a TV signal decoder of a SECAM TV system of the prior art.
Figure 5A:
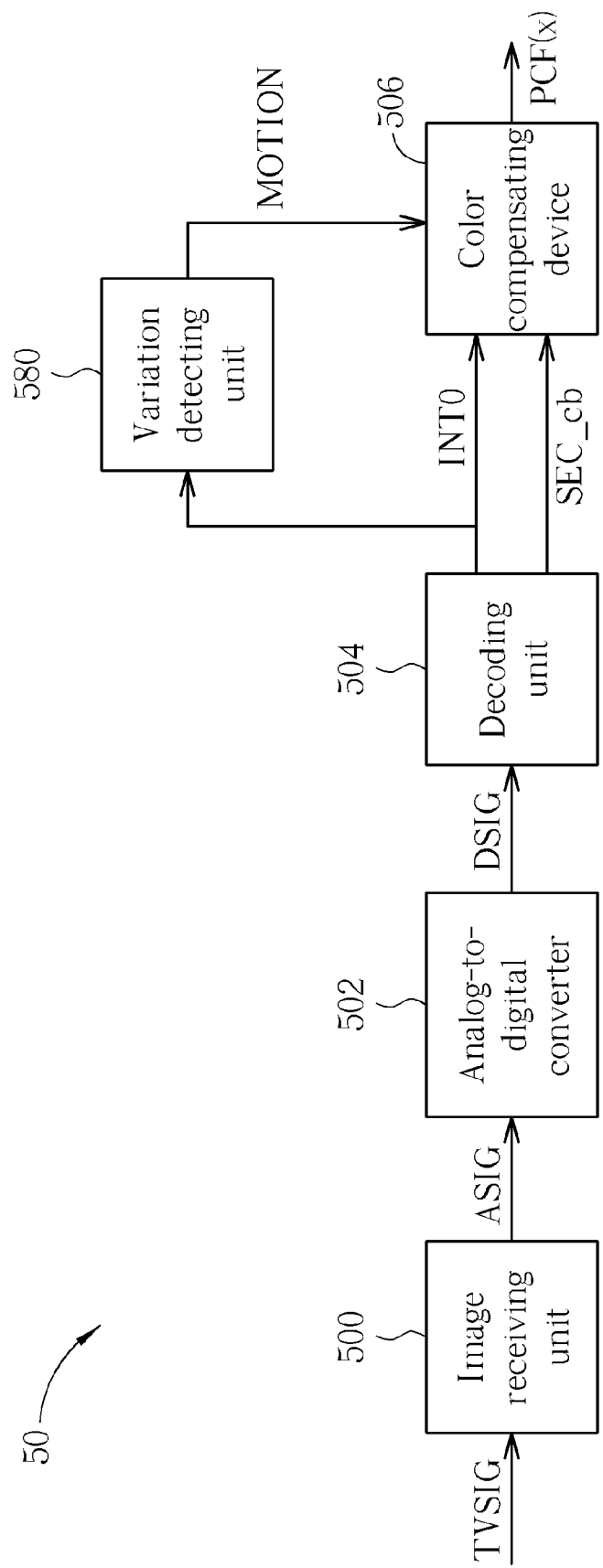
FIG. 5A illustrates a schematic diagram of an image processing device for a SECAM TV system according to an embodiment of the present invention.
Figure 5B:
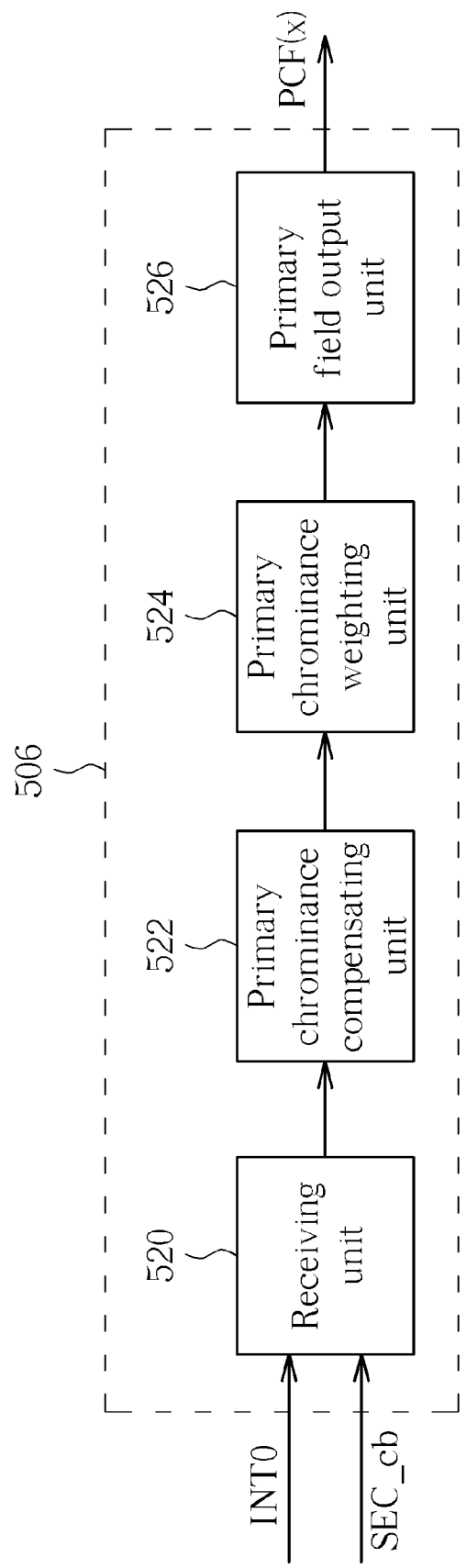
FIG. 5B illustrates a schematic diagram of a color compensating device according to an embodiment of the present invention.

Please refer to FIG. 5A, which illustrates a schematic diagram of an image processing device 50 for a SECAM TV system according to an embodiment of the present invention. The image processing device 50 comprises an image receiving unit 500, an analog-to-digital converter 502, a decoding unit 504, a color compensating device 506 and a variation detecting unit 580. The image receiving unit 500 is utilized for receiving a TV signal TVSIG, and the TV signal TVSIG is preferably a SECAM TV signal. The image receiving unit 500 transforms the TV signal TVSIG into an analog image signal ASIG by using a demodulating process. Next, the analog-to-digital converter 502 is utilized for transforming the analog image signal ASIG into a digital image signal DSIG. The decoding unit 504 decodes the digital image signal DSIG, and outputs a chrominance component indicator SEC_cb and the chrominance signal INT0. The chrominance signal INT0 is an image signal composed of field pictures, which can be denoted as field signals Field(x), where x is an ordinal number for indexing different fields, and x=1,2,3, . . . etc. Each field signal Field(x) further comprises a number of pixels, which can be denoted as Pixel(y), where y is an ordinal number for indexing different pixels, and y=1,2,3, . . . etc. Furthermore, each pixel signal Pixel(y) includes an original chrominance signal ($C_b^0$ or $C_r^0$), and a primary compensating chrominance signal ($C_b^p$ or $C_r^p$). Besides, the chrominance component indicator SEC_cb is utilized for indicating the original chrominance component of the current raster line is a $C_b^0$ or a $C_r^0$. To detail further, please refer to FIG. 5B, which illustrates a schematic diagram of the color compensating device 506 according to an embodiment of the present invention. The color compensating device 506 comprises a receiving unit 520, a primary chrominance compensating unit 522, a primary chrominance weighting unit 524 and a primary field output unit 526. The receiving unit 520 is utilized for receiving the output result of the decoding unit 504, which includes the chrominance component indicator SEC_cb and the chrominance signal INT0. Next, the primary chrominance compensating unit 522 substitutes the compensating chrominance signal ($C_b^P$ or $C_r^P$) of every pixel signal Pixel(y) in the field signal Field(x) by the original chrominance signal ($C_b^0$ or $C_r^0$) of the pixel Pixel($y_1$) of the same position in the screen from another field signal Field($x_1$), and generates the primary compensating result PCR(y). Next, the primary chrominance weighting unit 524 is utilized for calculating the primary weighted sum PWS(y) between the pixel signal Pixel(y) of every pixel and the primary compensating result PCR(y). Preferably, the primary chrominance compensating unit 522 substitutes the compensating chrominance signal ($C_b^P$ or $C_r^P$) of every pixel signal Pixel(y) in the field signal Field(x) by the original chrominance signal ($C_b^0$ or $C_r^0$) of the pixel Pixel($y_1$) of the same position in the screen from the field signal Field (x+2) or Field(x−2) (not shown in the figure), and generates the primary compensating result PCR(y).

Please refer to FIG. 6A, which illustrates the distribution of the chrominance components after the decoding unit 504 has completed filling up the chrominance signal INT0. The primary chrominance compensating unit 522 substitutes the compensating chrominance signal ($C_b^P$ or $C_r^P$) of every pixel signal Pixel(y) in the field signal Field(x) by the original chrominance signal ($C_b^0$ or $C_r^0$) of the pixel Pixel($y_1$) of the same position in the screen from the field signal Field(x+2) or Field(x−2) (not shown in the figure). For example, the primary compensating chrominance signal ($C_b^P$ or $C_r^P$) in the raster line Line(n+5) of field Field(k) can be copied from the original chrominance signal ($C_b^0$ or $C_r^0$) of the pixel of the same position from the field signal Field(k+2), and the primary compensating chrominance signal ($C_b^P$ or $C_r^P$) in the raster line Line(n+6) of field Field(k+1) can be copied from the original chrominance signal ($C_b^0$ or $C_r^0$) of the pixel of the same position from the field signal Field(k+1). According to the distribution of the original chrominance signal ($C_b^0$ or $C_r^0$) of FIG. 4A, the decoding unit 504 can generate a new chrominance distribution as depicted in FIG. 6B, which illustrates a distribution of the original chrominance signals $C_b^0$ and $C_r^0$ and the primary compensating chrominance signals $C_b^P$ and $C_r^P$ according to an embodiment of the present invention. According to the operating principles of the decoding unit 504, the primary compensating chrominance signal ($C_b^P$ or $C_r^P$) in the raster line Line(n+6) of field Field(k) is directly copied from the original chrominance signal ($C_b^0$ or $C_r^0$) of the pixel of the same position in the raster line Line(n+6) from the field signal Field(k+2), and the primary compensating chrominance signal ($C_b^P$ or $C_r^P$) in the raster line Line(n+7) of field Field(k−1) is directly copied from the original chrominance signal ($C_b^0$ or $C_r^0$) of the pixel of the same position in the raster line Line(n+7) from the field signal Field(k+1), and so forth. Therefore, when the TV screen receives a still pattern as specified in FIG. 4A, the present invention will automatically compensate the unsent chrominance signal, and the compensated chrominance signal in the raster lines Line(n+6) and Line(n+7) will no longer generate color flickering phenomena. Finally, the primary field output unit 526 outputs the primary weighted sum PWS(y) which corresponds to every pixel Pixel(y) in the field signal Field(x). Under this condition, since every pixel Pixel(y) in the field signal Field(x) corresponds to a primary weighted sum PWS(y), the primary weighted sum PWS(y) itself will constitute a field-type signal, and the field-type signal is denoted as a primary compensating field signal PCF(x).

Furthermore, the degree of variation of the pixel signal Pixel(y) can be specified by a variation index MOTION, the variation index MOTION is a decimal between 0 and 1, and is generated by a variation detecting unit 580. When MOTION=0, it means the contents of the pixel signal Pixel(y) is not changing from the preceding picture(s) to the current picture, and when the degree of variation increases, the variation index MOTION will increase accordingly with a maximal value at 1. Preferably, the primary weighted sum PWS(y) can be expressed as the following equation:

$$PWS(y)=PCR(y)*(1-MOTION)+Pixel(y)*MOTION$$

Noteworthily, since there are two chrominance components $C_b$ and $C_r$ a pixel signal Pixel(y), the equation above is performed for the blue chrominance component $C_b$ and the red chrominance component $C_r$ of the pixel signal Pixel(y), the primary compensating result PCR(y) and the primary weighted sum PWS(y), respectively.

Figure 7:
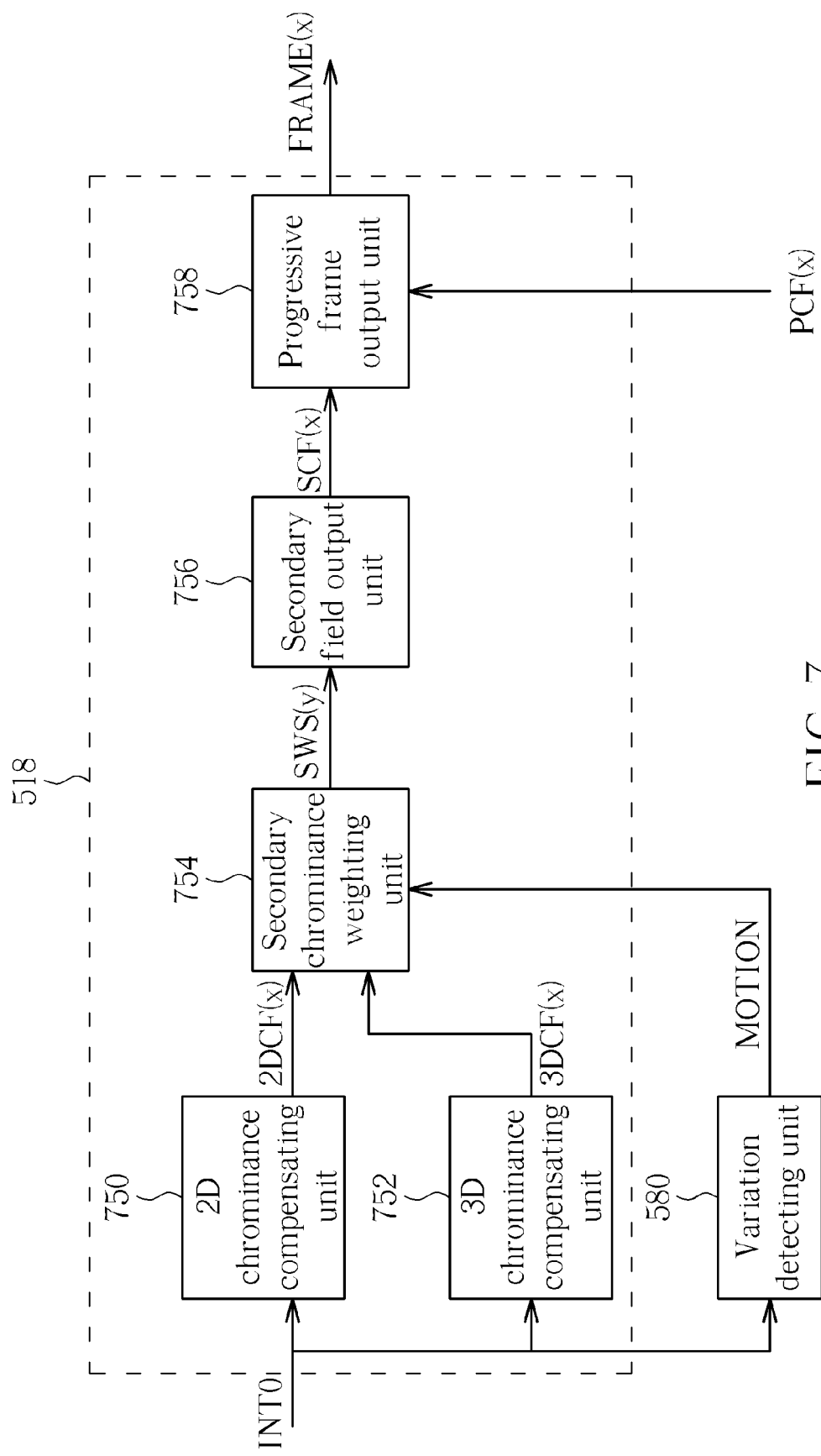
FIG. 7 illustrates a schematic diagram of a deinterlacer according to an embodiment of the present invention.

The image processing device 50 not only comprises an image receiving unit 500, an analog-to-digital converter 502, a decoding unit 504 and a color compensating device 506, but also comprises a deinterlacer 70. As illustrate in FIG. 7, the deinterlacer 70 is utilized for generating a progressive frame signal FRAME(x). In FIG. 7, the deinterlacer 70 comprises a 2D chrominance compensating unit 750, a 3D chrominance compensating unit 752, a secondary chrominance weighting unit 754, a secondary field output unit 756 and a progressive frame output unit 758. The 2D chrominance compensating unit 750 is utilized for generating a 2D compensating field signal 2DCF(x) according to the chrominance signal INT0. The 3D chrominance compensating unit 752 is utilized for generating a 3D compensating field signal 3DCF(x) according to the chrominance signal INT0. The secondary chrominance weighting unit 754 calculates a secondary weighted sum SWS(y) of the 2D compensating field signal 2DCF(x) and the 3D compensating field signal 3DCF(x) according to the variation index MOTION of every pixel Pixel(y). The secondary field output unit 756 is utilized for outputting the secondary weighted sum SWS(y) corresponding to every pixel signal Pixel(y), and since every pixel Pixel(y) in the field signal Field(x) corresponds to a secondary weighted sum SWS(y), the secondary weighted sum SWS(y) itself will also constitute a field-type signal, and is denoted as a secondary compensating field signal SCF(x). Finally, the progressive frame output unit 758 combines the primary compensating field signal PCF(x) and the secondary compensating field signal SCF(x) by interlacing the two field signals together to form a progressive frame signal FRAME(x).

Preferably, the 2D compensating field signal 2DCF(x) adopts a 2D deinterlace algorithm equivalent to the 2D deinterlace algorithm described in the prior art. In other words, the 2D chrominance compensating unit 750 is utilized for calculating the average value of two pixel signals Pixel(y) and Pixel($y_2$), wherein Pixel($y_2$) is a neighboring pixel of Pixel(y) and both of them belong to the same field Field(x), to generate a 2D compensating field signal 2DCF(x) corresponding to the field signal Field(x). The 3D chrominance compensating unit 752 is utilized for taking the original chrominance components $C_b^0$, $C_r^0$ from the pixels of the same position from field signals, Field(x−1) and Field(x+1), which are prior or posterior to the current field signals, respectively, and to generate a 3D compensating field signal 3DCF(x). Similarly, the degree of variation of the pixel signal Pixel(y) can be specified by a variation index MOTION, which is a decimal between 0 and 1, and is generated by a variation detecting unit 580. When MOTION=0, it means the contents of the pixel signal Pixel(y) does not change from the preceding picture(s) to the current picture, and when the degree of variation increases, the variation index MOTION will increase its value, and when MOTION=1, it means the variation of the contents reaches the maximal degree. Furthermore, the secondary weighted sum SWS(y) can be expressed as the following equation:

$$SWS(y)=3DCF(y)*(1-MOTION)+2DCF(y)*MOTION$$

Similarly, the blue chrominance component $C_b$ and the red chrominance component $C_r$ are being calculated separately for the 2D compensating pixel signal 2DCF(y), the 3D compensating pixel signal 3DCF(y) and the secondary weighted sum SWS(y).

Please refer to FIG. 8, which illustrates the distribution of the chrominance components after the 3D chrominance compensating unit 752 has completed filling up the chrominance signal INT1. For example, according to the functional principles of the 3D chrominance compensating unit 752, the secondary compensating chrominance signal Cb2, Cr2 in the raster line Line(n+5) of field Field(k) is directly copied from the original chrominance signal Cb2 and Cr2 of the pixel of the same position in the raster line Line(n+5) from the field signals Field(k) and Field(k+2), respectively; similarly, the secondary compensating chrominance signal Cb2, Cr2 in the raster line Line(n+6) of field Field(k−1) is directly copied respectively from the original chrominance signal Cb2 and Cr2 of the pixel of the same position in the raster line Line(n+6) from the field signal Field(k−1) and Field(k+1), and so forth. Therefore, as the TV displays the still picture, there will be no color flickering phenomena in the color boundary, which is located between the raster line Line(n+5) and Line(n+6) as illustrated in FIG. 8.

Figure 9:
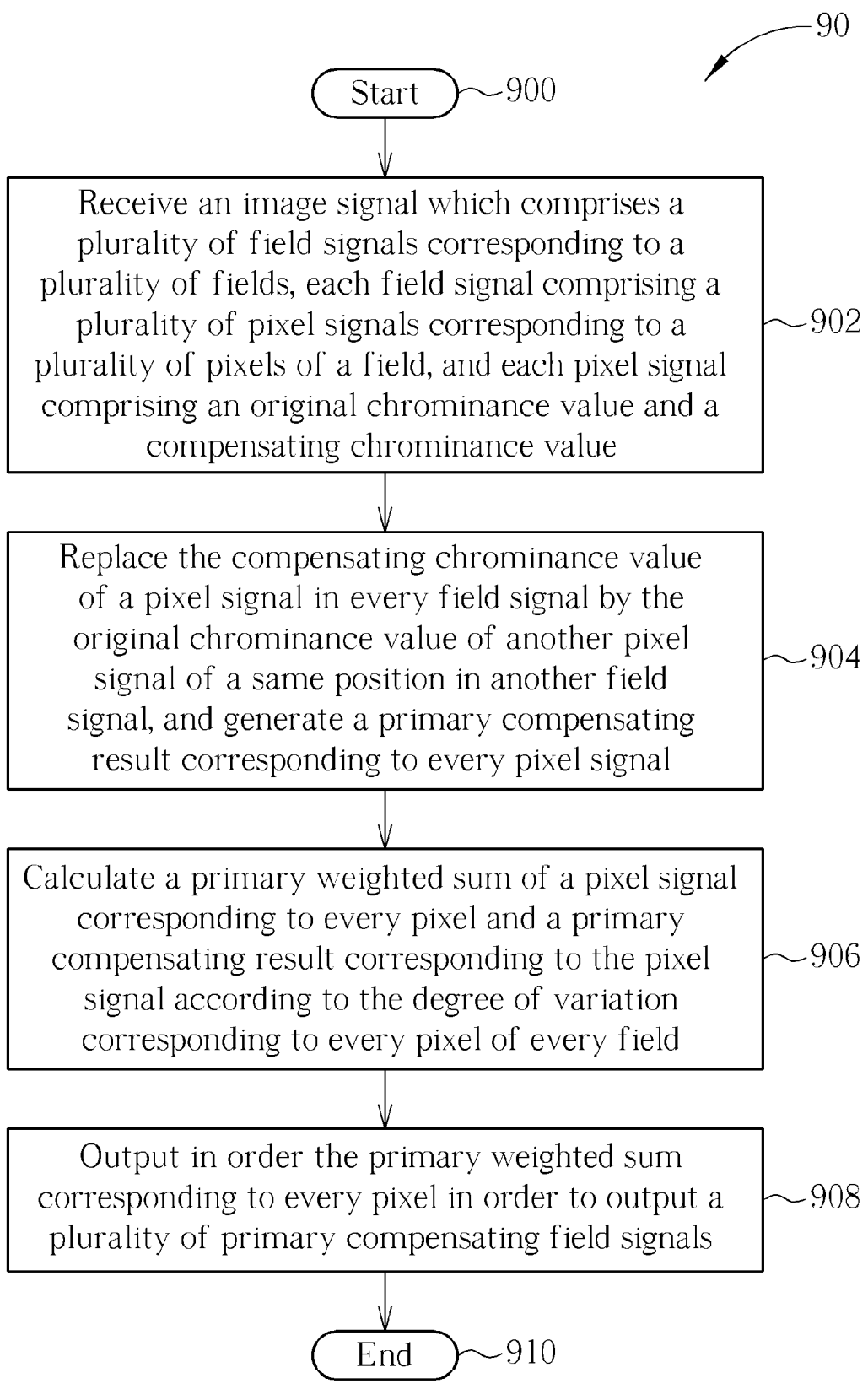
FIG. 9 illustrates an operating process utilized for reducing color flickering phenomena and advancing the picture quality according to an embodiment of the present invention.

According to the function and working principles of the image processing device 50, the present invention is then able to derive a process 90, utilized for reducing the color flickering phenomena and advancing the picture quality, as illustrated in FIG. 9. The process 90 comprises the following steps:

STEP 900: Start.

STEP 902: Receive an image signal which comprises a plurality of field signals corresponding to a plurality of fields, each field signal comprising a plurality of pixel signals corresponding to a plurality of pixels of a field, and each pixel signal comprising an original chrominance value and a compensating chrominance value.

STEP 904: Replace the compensating chrominance value of a pixel signal in every field signal by the original chrominance value of another pixel signal of a same position in another field signal, and generate a primary compensating result corresponding to every pixel signal.

STEP 906: Calculate a primary weighted sum of a pixel signal corresponding to every pixel and a primary compensating result corresponding to the pixel signal according to the degree of variation corresponding to every pixel of every field.

STEP 908: Output in order the primary weighted sum corresponding to every pixel in order to output a plurality of primary compensating field signals.

STEP 910: End.

Figure 10:
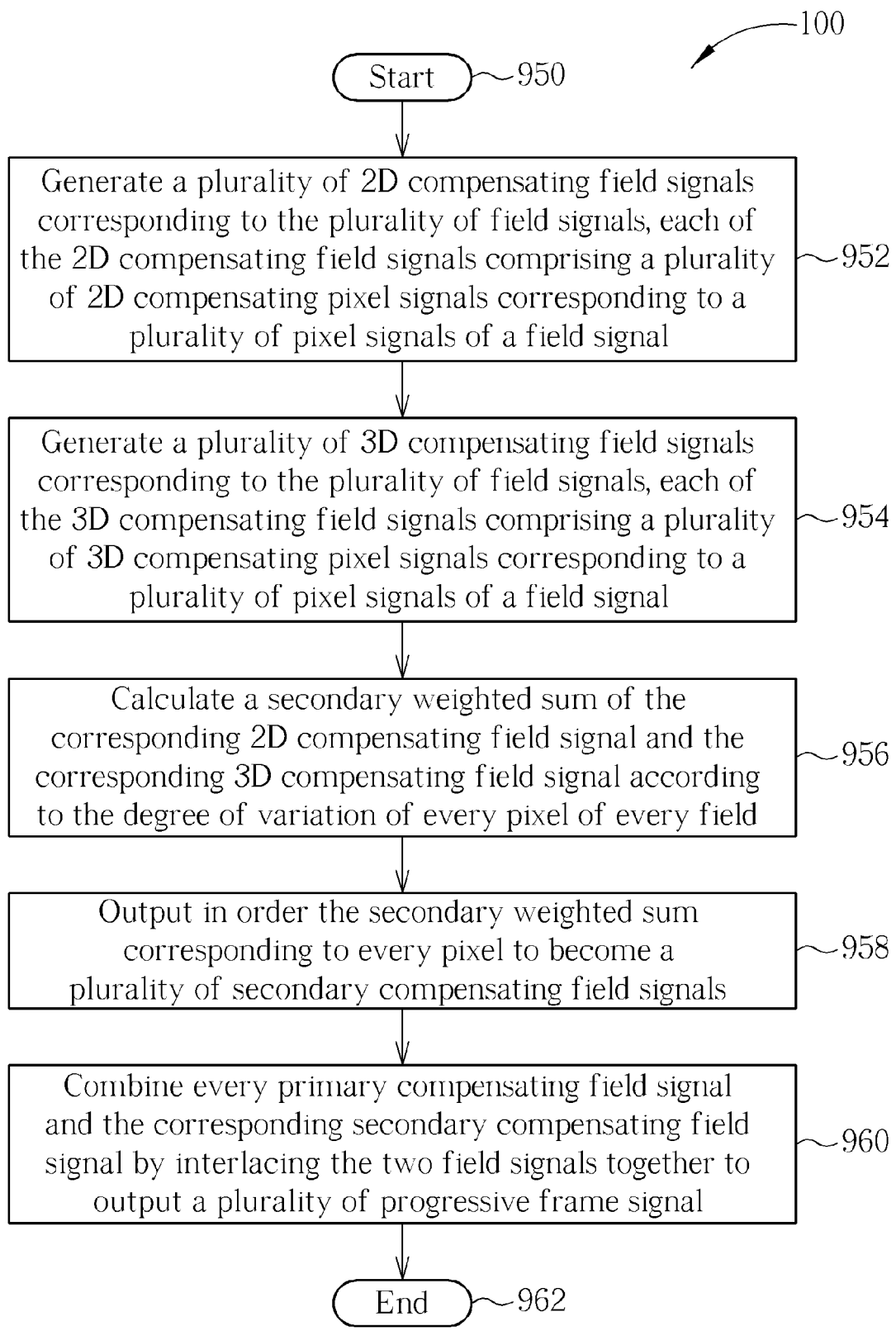
FIG. 10 illustrates an operating process utilized for transforming field signals into progressive frame signals according to an embodiment of the present invention.

Furthermore, the operations of the deinterlacer 70 can be organized as an operating process 100 as specified in FIG. 10.

The operating process 100 is utilized for transforming the field signal into the progressive frame signal, and comprises the following steps:

STEP 950: Start.

STEP 952: Generate a plurality of 2D compensating field signals corresponding to the plurality of field signals, each of the 2D compensating field signals comprising a plurality of 2D compensating pixel signals corresponding to a plurality of pixel signals of a field signal.

STEP 954: Generate a plurality of 3D compensating field signals corresponding to the plurality of field signals, each of the 3D compensating field signals comprising a plurality of 3D compensating pixel signals corresponding to a plurality of pixel signals of a field signal.

STEP 956: Calculate a secondary weighted sum of the corresponding 2D compensating field signal and the corresponding 3D compensating field signal according to the degree of variation of every pixel of every field.

STEP 958: Output in order the secondary weighted sum corresponding to every pixel to become a plurality of secondary compensating field signals.

STEP 960: Combine every primary compensating field signal and the corresponding secondary compensating field signal by interlacing the two field signals together to output a plurality of progressive frame signal.

STEP 962: End.

To sum up, the process 90 substitutes the compensating chrominance value of a pixel signal of every field signal by the original chrominance value of another pixel signal of the same position of another field signal, to generate a primary compensating result corresponding to every pixel signal, calculates its primary weighted sum, and generates a primary compensating field signal. The process 100 generates a 2D compensating field signal and a 3D compensating field signal of every pixel signal, to calculate its secondary weighted sum, and generate a secondary compensating field signal.

Besides, the present invention utilizes the variation index MOTION to indicate the degree of variation of the pixel signal Pixel(y). When a greater variation is detected for the pixel, the present invention gives more weight on the chrominance components from the same field, and less weight on the chrominance components from the other neighboring field. On the other hand, if only small or no variation is detected for the pixel, the present invention gives more weight on the chrominance components from the other neighboring field, and less weight on the chrominance components from the same field. By implementing this, the present invention can decrease the color flickering phenomena. In other words, the screen picture can be stabilized while the pixel(s) exhibits only small amount of variation.

Additionally, the present invention can utilize memory units such as the frame buffer(s) and the line buffer(s) originally contained in the deinterlacer 206 of the TV signal decoder 20 of the prior art. Meanwhile, according to the present invention, the 2D compensating field signal 2DCF(x) adopts the same 2D deinterlace algorithm of the prior art; therefore, the present invention can also modify the existing circuit of prior art, using the special design disclosed in the present invention to realize a novel architecture for color flickering cancellation, such that the development time can be shortened and the overall chip cost can be reduced.

To sum up, the present invention eliminates the color flickering phenomena happened in the chrominance signal INTLC0, and by detecting the variations of pixels in the picture, the present invention can calculate the weighted sum and adjust the pixel value according to the variation, such that the picture quality can be optimized. Finally, the traditional field signals can be transformed into the progressive frame signals of better quality.

Those skilled in the art will readily observe that numerous modifications and alterations of the device and method may be made while retaining the teachings of the invention.

What is claimed is:

1. A method for improving the image quality in an image processing device comprising:
   receiving an image signal, the image signal comprising a plurality of field signals corresponding to a plurality of fields, each field signal comprising a plurality of pixel signals corresponding to a plurality of pixels, and each pixel signal comprising an original chrominance value and a compensating chrominance value;
   replacing the compensating chrominance value of a pixel signal in every field signal by the original chrominance value of another pixel signal of a same position in another field signal, and generating a primary compensating result corresponding to every pixel signal;
   calculating a primary weighted sum of a pixel signal corresponding to every pixel and a primary compensating result corresponding to the pixel signal according to a degree of variation corresponding to every pixel of every field; and
   outputting in order the primary weighted sum corresponding to every pixel in order to output a plurality of primary compensating field signals.

2. The method of claim 1, wherein the step of replacing the compensating chrominance value of the pixel signal in every field signal by the original chrominance value of another pixel signal of the same position in another field signal is replacing the compensating chrominance value of the pixel signal in every field signal by the original chrominance value of another pixel signal of the same position in a field signal distanced by one field.

3. The method of claim 1 further comprising:
   generating a plurality of 2D compensating field signals corresponding to the plurality of field signals, each of the 2D compensating field signals comprising a plurality of 2D compensating pixel signals corresponding to a plurality of pixel signals of a field signal;
   generating a plurality of 3D compensating field signals corresponding to the plurality of field signals, each of the 3D compensating field signals comprising a plurality of 3D compensating pixel signals corresponding to a plurality of pixel signals of a field signal;
   calculating a secondary weighted sum of each corresponding 2D compensating field signal and each corresponding 3D compensating field signal according to the degree of variation of every pixel of every field;
   outputting in order the secondary weighted sum corresponding to every pixel to become a plurality of secondary compensating field signals; and
   combining every primary compensating field signal and a corresponding secondary compensating field signal by interlacing the two field signals together to output a plurality of progressive frame signals.

4. The method of claim 3, wherein the step of generating the plurality of 2D compensating field signals corresponding to the plurality of field signals comprises:
   getting an average value of every pixel signal and a neighboring field signal for every field signal, and generating every 2D compensating pixel signal corresponding to every field signal.

5. The method of claim 3, wherein the step of generating the plurality of 3D compensating field signals corresponding to the plurality of field signals comprises:
   getting a primary chrominance value of two pixel signals of the same position in two neighboring field signals for every field signal, and generating every 3D compensating pixel signal corresponding to every field signal.

6. The method of claim 3, wherein the step of combining every primary compensating field signal and the corresponding secondary compensating field signal by interlacing the two field signals together to output a plurality of progressive frame signal is taking the raster line as a basic unit, to interlace every primary compensating field signal and a corresponding secondary compensating field signal, and output the plurality of progressive frame signal.

7. The method of claim 1, wherein the image signal is a SECAM television signal.

8. The method of claim 7, wherein the compensating chrominance value is a red chrominance component $C_r$ when the original chrominance value is a blue chrominance component $C_b$.

9. The method of claim 7, wherein the compensating chrominance value is a blue chrominance component $C_b$ when the original chrominance value is a red chrominance component $C_r$.

10. A color compensating device for improving the image quality in an image processing device comprising:
    a receiving unit, for receiving an image signal, the image signal comprising a plurality of field signals corresponding to a plurality of fields, each field signal comprising a plurality of pixel signals corresponding to a plurality of pixels, and each pixel signal comprising an original chrominance value and a compensating chrominance value;
    a primary chrominance compensating unit, coupled to the receiving unit, for replacing the compensating chrominance value of a pixel signal in every field signal by the original chrominance value of another pixel signal of a same position in another field signal, and generating a primary compensating result corresponding to every pixel signal;
    a primary chrominance weighting unit, coupled to the primary chrominance compensating unit, for calculating a primary weighted sum of a pixel signal corresponding to every pixel and a primary compensating result corresponding to the pixel signal according to a degree of variation corresponding to every pixel of every field; and
    a primary field output unit, coupled to the primary chrominance weighting unit, for outputting in order the primary weighted sum corresponding to every pixel in order to output a plurality of primary compensating field signals.

11. The color compensating device of claim 10, wherein the primary chrominance compensating unit is to replace the compensating chrominance value of the pixel signal in every field signal by the original chrominance value of another pixel signal of the same position in a field signal distanced by one field.

12. The color compensating device of claim 10 further comprising:
    a 2D chrominance compensating unit, for generating a plurality of 2D compensating field signals corresponding to the plurality of field signals, each of the 2D compensating field signals comprising a plurality of 2D compensating pixel signals corresponding to a plurality of pixel signals of a field signal;
    a 3D chrominance compensating unit, for generating a plurality of 3D compensating field signals corresponding to the plurality of field signals, each of the 3D compensating field signals comprising a plurality of 3D compensating pixel signals corresponding to a plurality of pixel signals of a field signal;

a secondary chrominance weighting unit, coupled to the 2D chrominance compensating unit and the 3D chrominance compensating unit, for calculating a secondary weighted sum of each corresponding 2D compensating field signal and each corresponding 3D compensating field signal according to the degree of variation of every pixel of every field;

a secondary field output unit, coupled to the secondary chrominance weighting unit, for outputting in order the secondary weighted sum corresponding to every pixel to become a plurality of secondary compensating field signals; and a progressive frame output unit, coupled to the secondary field output unit, for combining every primary compensating field signal and a corresponding secondary compensating field signal by interlacing the two field signals together to output a plurality of progressive frame signals.

13. The color compensating device of claim 12, wherein the 2D chrominance compensating unit is utilized for getting an average value of every pixel signal and a neighboring field signal for every field signal, and generating every 2D compensating pixel signal corresponding to every field signal.

14. The color compensating device of claim 12, wherein the 3D chrominance compensating unit is utilized for getting a primary chrominance value of two pixel signals of the same position in two neighboring field signals for every field signal, and generating every 3D compensating pixel signal corresponding to every field signal.

15. The color compensating device of claim 12, wherein the progressive frame output unit is utilized for taking the raster line as a basic unit, to interlace every primary compensating field signal and a corresponding secondary compensating field signal, and output the plurality of progressive frame signal.

16. The color compensating device of claim 10, wherein the image signal is a SECAM television signal.

17. The color compensating device of claim 16, wherein the compensating chrominance value is a red chrominance component $C_r$ when the original chrominance value is a blue chrominance component $C_b$.

18. The color compensating device of claim 16, wherein the compensating chrominance value is a blue chrominance component $C_b$ when the original chrominance value is a red chrominance component $C_r$.

19. An image processing device capable of improving the image quality comprising:
a receiving unit, for receiving an analog image signal;
an analog-to-digital converter, coupled to the receiving unit, for converting the analog image signal into a digital image signal;
a decoding unit, coupled to the analog-to-digital converter, for decoding the digital image signal and generating a plurality of field signals corresponding to a plurality of fields, each field signal comprising a plurality of pixel signals corresponding to a plurality of pixels of a field, and each pixel signal comprising an original chrominance value and a compensating chrominance value; and
a color compensating device, coupled to the decoding unit, comprising:
a receiving unit, for receiving an image signal, the image signal comprising a plurality of field signals corresponding to a plurality of fields, each field signal comprising a plurality of pixel signals corresponding to a plurality of pixels, and each pixel signal comprising an original chrominance value and a compensating chrominance value;

a primary chrominance compensating unit, coupled to the receiving unit, for replacing the compensating chrominance value of a pixel signal in every field signal by the original chrominance value of another pixel signal of a same position in another field signal, and generating a primary compensating result corresponding to every pixel signal;

a primary chrominance weighting unit, coupled to the primary chrominance compensating unit, for calculating a primary weighted sum of a pixel signal corresponding to every pixel and a primary compensating result corresponding to the pixel signal according to a degree of variation corresponding to every pixel of every field; and a primary field output unit, coupled to the primary chrominance weighting unit, for outputting in order the primary weighted sum corresponding to every pixel in order to output a plurality of primary compensating field signals.

20. The image processing device of claim 19, wherein the primary chrominance compensating unit is to replace the compensating chrominance value of the pixel signal in every field signal by the original chrominance value of another pixel signal of the same position in a field signal distanced by one field.

21. The image processing device of claim 19 further comprising:
a 2D chrominance compensating unit, for generating a plurality of 2D compensating field signals corresponding to the plurality of field signals, each of the 2D compensating field signal comprising a plurality of 2D compensating pixel signals corresponding to a plurality of pixel signals of a field signal;
a 3D chrominance compensating unit, for generating a plurality of 3D compensating field signals corresponding to the plurality of field signals, each of the 3D compensating field signal comprising a plurality of 3D compensating pixel signals corresponding to a plurality of pixel signals of a field signal;
a secondary chrominance weighting unit, coupled to the 2D chrominance compensating unit and the 3D chrominance compensating unit, for calculating a secondary weighted sum of each corresponding 2D compensating field signal and each corresponding 3D compensating field signal according to the degree of variation of every pixel of every field;
a secondary field output unit, coupled to the secondary chrominance weighting unit, for outputting in order the secondary weighted sum corresponding to every pixel to become a plurality of secondary compensating field signals; and
a progressive frame output unit, coupled to the secondary field output unit, for combining every primary compensating field signal and the corresponding secondary compensating field signal by interlacing the two field signals together to output a plurality of progressive frame signal.

22. The image processing device of claim 21, wherein the 2D chrominance compensating unit is utilized for getting an average value of every pixel signal and a neighboring field signal for every field signal, and generating every 2D compensating pixel signal corresponding to every field signal.

23. The image processing device of claim 21, wherein the 3D chrominance compensating unit is utilized for getting a primary chrominance value of two pixel signals of the same position in two neighboring field signals for every field signal, and generating every 3D compensating pixel signal corresponding to every field signal.

24. The image processing device of claim 21, wherein the progressive frame output unit is utilized for taking the raster line as a basic unit, to interlace every primary compensating field signal and a corresponding secondary compensating field signal, and output the plurality of progressive frame signal.

25. The image processing device of claim 19, wherein the image signal is a SECAM television signal.

26. The image processing device of claim 25, wherein the compensating chrominance value is a red chrominance component $C_r$ when the original chrominance value is a blue chrominance component $C_b$.

27. The image processing device of claim 25, wherein the compensating chrominance value is a blue chrominance component $C_b$ when the original chrominance value is a red chrominance component $C_r$.

* * * * *